US012794069B2

(12) United States Patent
Steiner et al.

(10) Patent No.: US 12,794,069 B2
(45) Date of Patent: Nov. 10, 2026

(54) BATTERY DEVICE FOR A MOTOR VEHICLE POWERED AT LEAST SEMI-ELECTRICALLY, WITH A COOLING DEVICE FOR DIRECT COOLING OF BATTERY CELLS

(71) Applicant: Dr. Ing. h.c. F. Porsche Aktiengesellschaft, Stuttgart (DE)

(72) Inventors: Oliver Steiner, Lehrensteinsfeld (DE); Dominik Grass, Bietigheim-Bissingen (DE); Markus Göhring, Nufringen (DE); Tim Schmidt, Freiberg am Neckar (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 645 days.

(21) Appl. No.: 18/208,362

(22) Filed: Jun. 12, 2023

(65) Prior Publication Data

US 2023/0402699 A1 Dec. 14, 2023

(30) Foreign Application Priority Data

Jun. 13, 2022 (DE) ..................... 10 2022 114 797.5

(51) Int. Cl.
*H01M 50/262* (2021.01)
*B60L 50/64* (2019.01)
(Continued)

(52) U.S. Cl.
CPC ........... *H01M 50/262* (2021.01); *B60L 50/64* (2019.02); *B60L 58/26* (2019.02); *H01M 10/613* (2015.04);
(Continued)

(58) Field of Classification Search
CPC ... H01M 50/262; H01M 50/26; H01M 50/296
See application file for complete search history.

(56) References Cited

U.S. PATENT DOCUMENTS

| | | | | |
|---|---|---|---|---|
| 2017/0327091 | A1* | 11/2017 | Capizzo | B60L 53/68 |
| 2019/0016231 | A1* | 1/2019 | Scaringe | H01M 10/613 |
| 2020/0307346 | A1 | 10/2020 | Kalmbach et al. | |

FOREIGN PATENT DOCUMENTS

| | | | |
|---|---|---|---|
| AT | 514746 | A1 | 3/2015 |
| DE | 102012018048 | A1 | 3/2014 |

(Continued)

OTHER PUBLICATIONS

Machine Translation of: AT 514746 A1, Harrich et al., Mar. 15, 2015.*

*Primary Examiner* — Kenneth J Douyette
(74) *Attorney, Agent, or Firm* — Buchanan Ingersoll & Rooney PC

(57) ABSTRACT

A battery device for a motor vehicle powered at least semi-electrically, with a cooling device having a coolant circuit for direct cooling of battery cells and with a battery housing having a housing space for receiving the battery cells. The housing space provides a portion of the coolant circuit, such that a coolant can directly flow around the battery cells. The cooling device includes a terminal device arranged on the battery housing, via which the coolant can be introduced into the battery housing or discharged out of the battery housing. The terminal device provides a degassing opening for the battery housing. In case of a overpressure in the housing space, the degassing opening opens via at least one breaking device.

10 Claims, 2 Drawing Sheets

(51) Int. Cl.
*B60L 58/26* (2019.01)
*H01M 10/613* (2014.01)
*H01M 10/625* (2014.01)
*H01M 50/296* (2021.01)
*H01M 50/342* (2021.01)

(52) U.S. Cl.
CPC ....... *H01M 10/625* (2015.04); *H01M 50/296* (2021.01); *H01M 50/3425* (2021.01); *H01M 2220/20* (2013.01)

(56) References Cited

FOREIGN PATENT DOCUMENTS

| | | | |
|---|---|---|---|
| DE | 102019204270 | A1 | 10/2020 |
| DE | 102020101266 | B3 | 12/2020 |

* cited by examiner

BATTERY DEVICE FOR A MOTOR VEHICLE POWERED AT LEAST SEMI-ELECTRICALLY, WITH A COOLING DEVICE FOR DIRECT COOLING OF BATTERY CELLS

CROSS-REFERENCE TO RELATED APPLICATION

This application claims priority to German Patent Application No. 10 2022 114 797.5, filed Jun. 13, 2022, the content of such application being incorporated by reference herein in its entirety.

FIELD OF THE INVENTION

The present invention relates to a battery device for a motor vehicle powered at least semi-electrically and comprises at least one cooling device with a coolant circuit for direct cooling of battery cells. The battery device comprises at least one battery housing having a housing space for receiving the battery cells. The housing space provides a portion of the coolant circuit, such that a coolant can directly flow around at least sections of the battery cells.

BACKGROUND OF THE INVENTION

A battery device with directly cooled battery cells is known, for example, from DE 10 2020 101 266 B3, which is incorporated by reference herein.

In the event of a malfunction and, for example, in the case of a so-called thermal runaway of the battery cells, a lot of gas is typically generated, which must be conducted out of the battery cells and also out of the housing. Gases are discharged from the battery housing via openings in the battery housing.

DE 10 2012 018 048 A1, which is incorporated by reference herein discloses a battery with a battery housing in which an opening for degassing is arranged. In addition, the battery cells comprise a breaking device via which gas can enter into the housing space from its interior in the event of a malfunction. The gas located in the housing space is then discharged into the environment via the opening in the battery housing.

AT 514746 A1, which is incorporated by reference herein discloses a terminal unit with two coolant terminals, each having two ends. One respective end is connected to a heat exchanger. The other respective end is connected to the cooling system of the battery. The terminal units are respectively configured in a tubular manner and are arranged on a pot-like base body. The base body is fastened to the battery housing and can comprise a region for collecting condensation water, which forms during the operation in the battery housing. The condensation water can be discharged via an outlet in the base body. The base body can comprise a breaking device via which gas can be removed from the battery housing in the event of a malfunction.

SUMMARY OF THE INVENTION

In conventional cooling systems in which the coolant does not have direct contact with the battery cells or the housing space and is in a hermetically sealed cooling circuit, such options for degassing are generally possible without complication. However, in the case of a directly cooled battery, the openings for degassing must be sealed with great constructive effort. This is because they do not simply need to close the housing space, but rather must seal it securely against coolant and in a pressure-tight manner.

In view of the foregoing, described herein is an improved battery device in comparison thereto. The device may be reliably tight and may enable a reliable degassing in the event of a malfunction. At the same time, the solution may be low-effort in terms of construction and economical for manufacturing, as well as replaceable in a space-saving manner.

The battery device according to aspects of the invention is provided for an at least semi-electrically driven motor vehicle. The battery device comprises at least one cooling device having a coolant circuit for direct cooling of battery cells. The battery device comprises at least one battery housing having a housing space for receiving the battery cells. The housing space provides a portion of the coolant circuit, such that a coolant can directly flow around at least sections of the battery cells. The cooling device comprises at least one terminal device arranged on the battery housing. Via the terminal device, the coolant can be introduced into the battery housing or discharged out of the battery housing. The terminal device provides at least one degassing opening (can be opened in case of a malfunction and is closed in normal operation) for the battery housing. The degassing opening is in particular integrated into the terminal device. The terminal device is suitable and configured so as to open the degassing opening by means of at least one breaking device at a (defined) overpressure in the housing space and to drain gases as well as the coolant out of the housing space.

The battery device according to aspects of the invention offers many advantages. The terminal device, with its integrated degassing opening, offers a significant advantage, so that gases and coolant can be discharged together from the battery housing via the terminal device. The cooling device is thus also used in order to degas the housing space. It is also particularly advantageous for the terminal device to open the degassing opening by means of a breaking device. Further valves or openings that must be introduced constructively into the battery housing can be omitted in the invention. At the same time, safe and reliable degassing in the event of a malfunction is ensured. With the invention, construction space, weight, and components to be spared.

Preferably, the terminal device comprises at least one terminal unit that can be fluidly connected to the conduction device and the battery housing. In particular, the terminal unit can be fastened to the battery housing by means of at least one fastening unit. The fastening unit is in particular fixedly connected to the terminal unit. The fastening unit can be formed integrally on the terminal unit. Then, the fastening unit is in particular detachably fastened to the battery housing. For example, the fastening unit can comprise a threading or be configured as such. The fastening unit can also be fixedly connected to the battery housing. Then, the fastening unit is in particular detachably fastened to the terminal unit.

In an advantageous configuration, the breaking device is integrated into at least the fastening unit. In particular, the breaking device is provided at least by the fastening unit. It is preferred and advantageous when the fastening unit is at least partially detachable from the terminal unit and/or the battery housing by a defined overpressure in the housing space. In particular, the degassing opening can be opened as a result. The disengagement of the fastening unit from the terminal unit and/or the battery housing can be non-destructive or can involve destruction of the fastening unit in the event of a malfunction.

Preferably, the fastening unit can be destroyed by a defined overpressure in the housing space. Preferably, this fluidly decouples the terminal unit from the battery housing. In particular, this results in leakage between the terminal unit and the battery housing. It is also possible that the terminal unit can be fluidly decoupled from the battery housing by the defined overpressure without destruction of the fastening unit. For example, the terminal unit can detach from the battery housing in a non-destructive manner.

In a preferred and advantageous further development, the fastening unit can be destroyed by a defined overpressure in the housing space such that (due to the destruction) a flow cross-section results for the degassing opening that is larger than a flow cross-section of the terminal unit. In particular, the flow cross-section of the degassing opening is at least 1.5 times greater than, and preferably at least twice, and more preferably at least four times, or many times greater than the flow cross-section of the terminal unit. In particular, the flow cross-section of the terminal unit corresponds to a clear width of a connection channel of the terminal unit.

In an advantageous further development, the fastening unit comprises at least one threaded connection. In particular, the fastening unit is screwed to the battery housing and/or the terminal unit by means of the threaded connection. Preferably, the threaded connection is suitable and configured so as to fail, and in particular to tear off, at a defined overpressure in the housing space.

In a likewise advantageous and preferred configuration, the breaking device is integrated into at least the terminal unit. In particular, the breaking device is provided at least by the terminal unit. Preferably, the terminal unit comprises at least one connection channel through which the coolant can flow. Preferably, at least one channel wall of the connection channel can be destroyed by a defined overpressure in the housing space. In particular, the degassing opening is thereby opened. The connection channel is in particular part of the coolant circuit. In particular, the connection channel extends between the battery housing and the conduction device.

Preferably, the channel wall has a targeted reduction of its wall thickness. In particular, the reduction in wall thickness is configured such that the reduction leads to failure of the channel wall upon a defined overpressure in the housing space. The channel wall can also comprise a further suitable weakening of the material.

In particular, the terminal unit and the conduction device are held together in a fluid-tight manner by means of at least one coupling unit. It is preferred and advantageous when the breaking device is integrated into at least the coupling unit. In particular, the breaking device is provided at least by the coupling unit. Preferably, the coupling unit is suitable and configured so as to fluidly decouple and preferably detach the terminal unit from the conduction device at a defined overpressure in the housing space.

In a particularly advantageous design, the coupling unit fixes the conduction device to the terminal unit in a frictionally locking manner. Preferably, the frictional lock can be released by the defined overpressure in the housing space. In addition or alternatively, the coupling unit can also fix the conduction device to the terminal unit in a positively locking manner. In particular, the positive lock can be released by the defined overpressure in the housing space.

The coupling unit is in particular provided by a hose nozzle or comprises at least one of the latter. In particular, the conduction device comprises at least one hose or is configured as such. In particular, the hose can be pushed onto the hose nozzle (in a frictionally and/or positively locking manner) and/or inserted into the hose nozzle. The hose can preferably be detached from the hose nozzle by the defined overpressure in the housing space.

In particular, the conduction device comprises at least one hose that can be connected to the terminal unit. The conduction device can also comprise a pipe that can be connected to the terminal unit. The conduction device can be at least partially flexible and/or rigid.

The conduction device and the terminal unit and the fastening unit and the battery housing are in particular fluidly connected to one another and part of the coolant circuit, and can preferably be configured such that coolant can flow around at least sections thereof.

In the normal state or prior to a malfunction with a defined overpressure in the housing space, the breaking device is in particular intact and closes the degassing opening. With a defined overpressure in the housing space, the breaking device is preferably influenced such that the degassing opening is opened or open. In particular, both the breaking device and the degassing opening are integrated into the terminal device. In particular, the degassing opening is provided by a deliberate leakage in the terminal device. In particular, the opening of the degassing opening takes place by specifically generating a leakage in the terminal device.

The information regarding pressures and tightness and other requirements in the context of the present invention relate in particular to the pressure conditions that are to prevail during proper operation or in the event of a malfunction. When degassing is mentioned in the context of the present invention, it means in particular a degassing in the event of a malfunction and, for example, in the case of a thermal runaway. In particular, the degassing opening is always closed during normal operation. In particular, the degassing opening only opens in a pressure-initiated manner and/or in a temperature-initiated manner under conditions that occur in the event of a malfunction of the battery, and in particular in the event of a thermal runaway. When the degassing opening is open, the gases and the coolant can escape from the housing space through the degassing opening. The defined overpressure in the housing space corresponds in particular to a limit value of the overpressure to be expected during the malfunction, which is not to be exceeded.

In particular, the battery device comprises at least one feeding terminal and at least one drainage terminal. The feeding terminal can be configured as a terminal device according to aspects of the invention and/or the drainage connection can be configured as a terminal device according to the invention. The battery device then comprises in particular at least two terminal devices. The terminals can be configured identically or can differ in terms of to their previously described configurations.

In particular, the battery device is configured as a traction battery or at least part of one. The battery device is preferably configured as a battery module. The battery module is in particular part of a battery assembly having a plurality of interconnected battery modules. The battery assembly can be configured as a traction battery. The battery assembly can comprise a main housing in which the battery modules are housed.

The battery device stores the electrical energy, in particular on an electrochemical basis. Additionally, or alternatively, the battery device can also store the electrical energy in an electrical field. The battery device is then configured as a capacitor device, for example, or as a hybrid capacitor. The battery cells are in particular configured as electrochemical cells and/or as capacitors. The battery device is in particular rechargeable. A coolant can directly flow around at least sections of the battery cells. The battery cells are in particular fixed in the battery housing while floating in the coolant.

BRIEF DESCRIPTION OF THE DRAWINGS

Further advantages and features of the present invention follow from the embodiment examples, which are described below with reference to the accompanying drawings.

The drawings show.

DETAILED DESCRIPTION OF THE INVENTION

Figure 1:
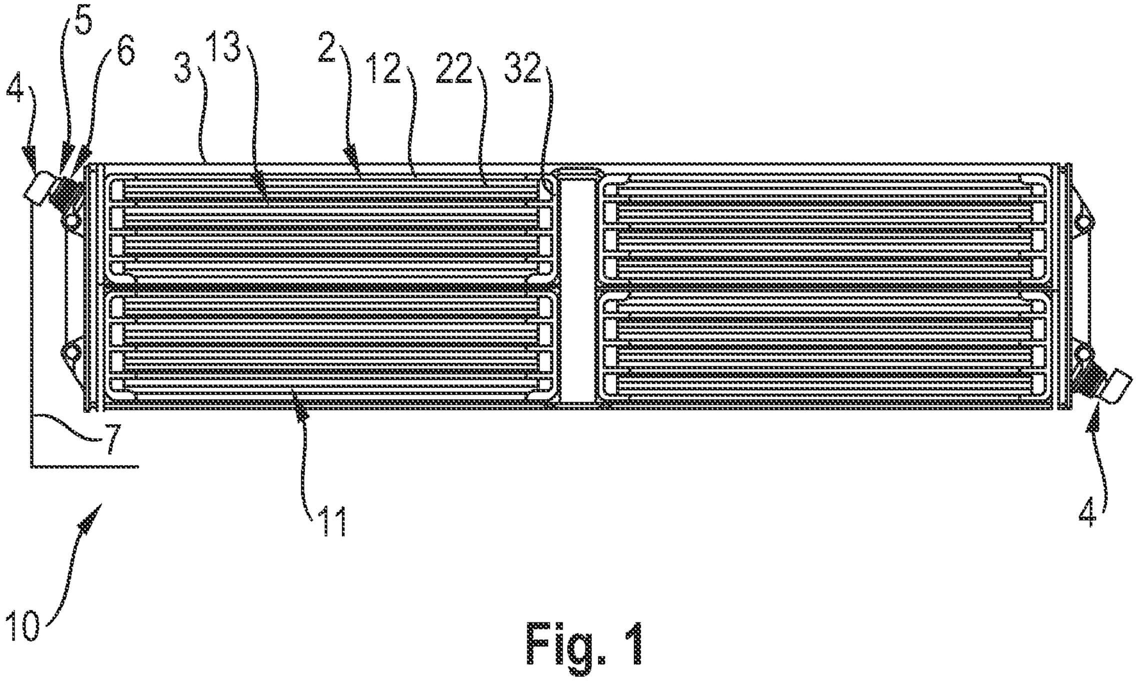
FIG. 1 a purely schematic illustration of a battery device according to aspects of the invention in a top plan view.

FIG. 1 shows a battery device 1 according to aspects of the invention with a battery housing 3 and a cooling device 10 for direct cooling of battery cells 2. The battery housing 3 is shown here without a top cover, so that the components received in a housing space 13 of the battery housing 3 are visible.

In the housing space 13, battery cells 2 are accommodated, shown here as pouch cells 12. Intermediate elements 22 are arranged between the battery cells 2, which can be configured, for example, as cooling plates. The lined-up battery cells 2 and intermediate elements 22 are fixed to the retaining elements 32 here.

To fluidly connect the battery housing 3 to a coolant circuit 11 of the cooling device 10, the battery housing 3 is equipped here with two terminal devices 4. Via the coolant circuit 11, the heat generated in operation is discharged from the battery cells 2 via a coolant flowing in the battery housing 3 and directly around the battery cells 2. A terminal device 4 is configured as a feeding terminal. The other terminal device 4 is configured as a drain connection. The terminal devices 4 are connected to a conduction device 7, which is only schematically sketched here.

One or both terminal devices 4 comprise an integrated degassing opening 5, via which the battery housing 3 can be degassed in the event of a malfunction and, for example, a thermal runaway the battery cells 2. In normal operation, the degassing opening 5 is closed. In a thermal event of one or more battery cells 2, they gas out, thereby creating an overpressure in the housing space 13. When a certain overpressure in the housing space 13 is reached, the degassing opening 5 is selectively opened and the gases as well as the coolant are released from the housing space 13. The opening of the degassing opening 5 is carried out by means of one or more breaking devices 6, which selectively fail when a defined overpressure is reached and thereby cause a leakage on the terminal device 4. The leakage can allow the gases and coolant to escape into an environment with lower pressure.

By the combination with direct cooling, the battery cells 2 here degas directly into the coolant. This results in a mixing of the leaked gases with the coolant. The sudden increase in pressure necessitates the provision of targeted pressure relief in the battery housing 3 and thus also in the coolant circuit 11, so that components do not burst uncontrollably.

Figure 2:
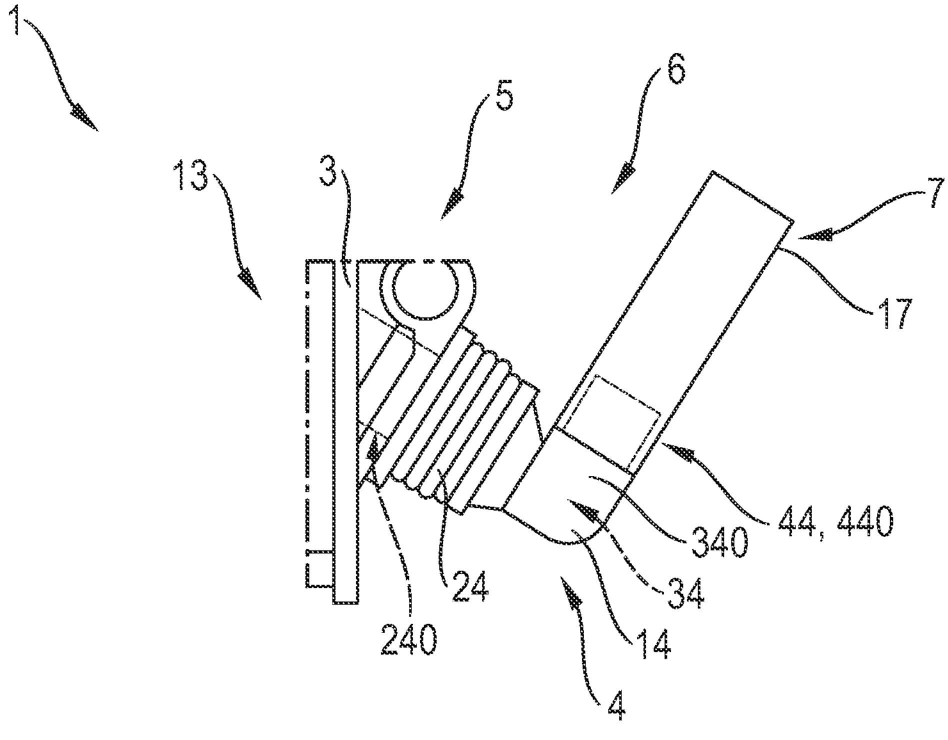
FIG. 2 a detailed illustration of the battery device of FIG. 1.

FIG. 2 shows an enlarged illustration of a terminal device 4, as used for example in the battery device 1 presented in relation to FIG. 1. The terminal device 4 here comprises a terminal unit 14, which is fastened to the battery housing 3 in a fluid-tight manner via a fastening unit 24. The terminal unit 14 here is connected to a hose 17 of the conduction device 7 via a coupling unit 44. A connection channel 34, which is not visible here, extends within the terminal unit 14, through which channel the coolant can flow in normal operation, sealed outwardly.

The breaking device 6 here is integrated into the fastening unit 24, purely by way of example. When a certain overpressure is reached in the housing space 13, the fastening unit 24 thereby fails, so that the terminal unit 14 detaches from the battery housing 3. For example, the fastening unit 24 is equipped with a threaded connection 240 and screwed into the battery housing 3. A failure of the breaking device 6 then corresponds to, for example, a tearing of the threaded connection 240 off the battery housing 3.

Additionally or alternatively, the breaking device 6 can be integrated into the terminal unit 14 and can be configured as a targeted reduction of the wall thickness of a channel wall 340 of the connection channel 34, for example. The terminal unit 14 can additionally or alternatively also have a further weakening elsewhere, which serves as the breaking device 6.

The breaking device 6 can alternatively or additionally also be integrated into the coupling unit 44. For example, the coupling unit 44 comprises a hose nozzle 44 on which the hose 17 is pushed. When a certain overpressure in the housing space 13 is reached, there is a targeted slipping or gliding of the hose 17 from the hose nozzle 440.

Figure 3:
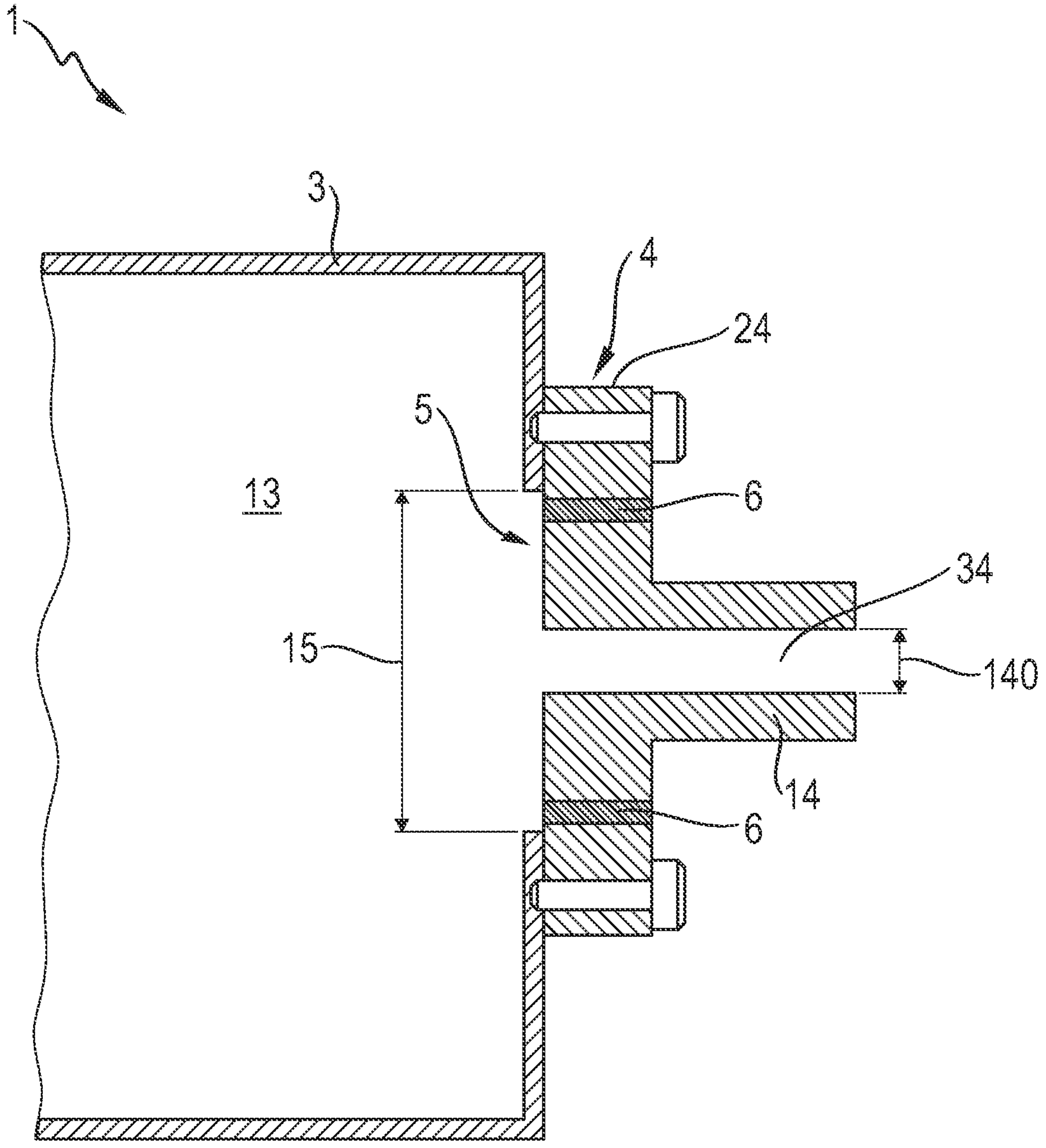
FIG. 3 a detailed illustration of a configuration of the battery device of FIG. 1.

FIG. 3 shows a terminal device 4 with a breaking device 6 integrated in the fastening unit 24. The fastening unit 24 thereby breaks at a defined overpressure in the housing space 13 at the breaking device 6 such that a flow cross-section 15 results for the degassing opening 5, which is, for example, many times greater than the flow cross-section 140 of the connection channel 34 of the terminal unit 14. Thus, more gas volume and coolant can escape in a shorter time, and the overpressure can be reduced very quickly. The failure of the breaking device 6 can, for example, also cause the complete fastening unit 24 to detach from the battery housing 3. The fastening unit 24 here is screwed to the battery housing 3 purely by way of example. However, other suitable fastening means are also possible.

The previously described embodiments of the breaking devices 6 can each be provided on their own or in combination with one another on the terminal device 4. Due to the failure of the breaking devices 6, one or more degassing openings 5 are opened, so that a targeted pressure relief can be carried out via the terminal devices 4, which are already necessary. Specific openings or valves on the battery housing 3 can therefore be omitted.

LIST OF REFERENCE NUMBERS

1 Battery device
2 Battery cell
3 Battery housing
4 Terminal device
5 Degassing opening
6 Breaking device
7 Conduction device
10 Cooling device
11 Coolant circuit
12 Pouch cell
13 Housing space
14 Terminal unit

15 Flow cross-section
17 Hose
22 Intermediate element
24 Fastening unit
32 Retaining element
34 Connection channel
44 Coupling unit
140 Flow cross-section
240 Threaded connection
340 Channel wall
440 Hose nozzle

What is claimed is:

1. A battery device for a motor vehicle powered at least semi- electrically, said battery device comprising at least one cooling device including:

(i) a coolant circuit for direct cooling of battery cells of the battery device, (ii) at least one battery housing having a housing space for receiving the battery cells, wherein the housing space defines a portion of the coolant circuit, such that a coolant can directly flow around at least sections of the battery cells, (iii) a terminal device arranged on the battery housing, via which the coolant can be introduced into the battery housing or discharged out of the battery housing, wherein the terminal device defines at least one degassing opening for the battery housing, wherein the terminal device comprises at least one terminal unit that is configured to be fluidly connected to a conduction device and the battery housing, and wherein the terminal unit is configured to be fastened to the battery housing by at least one fastening unit, wherein the terminal unit and the conduction device are held together in a fluid-tight manner by at least one coupling unit, and wherein the coupling unit is configured so as to fluidly decouple the terminal unit from the conduction device upon a defined overpressure in the housing space, and (iv) one or more breaking devices that isare each configured, in case of an-the defined overpressure in the housing space, to open the degassing opening and to release gases as well as coolant out of the housing space, wherein at least one breaking device of the one or more breaking devices is integrated into at least the coupling unit.

2. The battery device according to claim 1, wherein another breaking device of the one or more breaking devices is integrated into at least the fastening unit, and wherein the fastening unit is at least partially detachable from the terminal unit and/or the battery housing by the defined overpressure in the housing space.

3. The battery device according to claim 1, wherein the fastening unit is configured to be destroyed by the defined overpressure in the housing space such that the terminal unit is fluidly decoupled from the battery housing.

4. The battery device according to claim 3, wherein the fastening unit is configured to be destroyed such that a flow cross-section for the degassing opening results that is greater than a flow cross-section of the terminal unit.

5. The battery device according to claim 1, wherein the fastening unit comprises a threaded connection and is screwed via the threaded connection on the battery housing or on the terminal unit, and wherein the threaded connection is configured so as to fail upon the defined overpressure in the housing space.

6. The battery device according to claim 1, wherein another breaking device of the one or more breaking devices is integrated into the terminal unit and wherein the terminal unit comprises a connection channel through which the coolant can flow, and wherein a channel wall of the connection channel is configured to be destroyed by the defined overpressure in the housing space.

7. The battery device according to claim 6, wherein the channel wall comprises a targeted reduction of a wall thickness of the channel wall.

8. The battery device according to claim 1, wherein the coupling unit fixes the conduction device to the terminal unit in a frictionally locking manner, and wherein the frictional lock is configured to be released by the defined overpressure in the housing space.

9. The battery device according to claim 1, wherein the coupling unit is a hose nozzle, and wherein the conduction device comprises a hose which can be slid onto the hose nozzle, and wherein the hose is configured to detach from the hose nozzle by the defined overpressure in the housing space.

10. A motor vehicle comprising the battery device of claim 1.

* * * * *